United States Patent [19]

Tanaka et al.

[11] Patent Number: 5,058,151
[45] Date of Patent: Oct. 15, 1991

[54] MULTI-USER CORDLESS TELEPHONE CAPABLE OF DISCERNIBLY NOTIFYING EACH USER

[75] Inventors: Masayuki Tanaka, Kokubunji; Koichi Ito, Hino, both of Japan

[73] Assignee: Kabushiki Kaisha Toshiba, Kawasaki, Japan

[21] Appl. No.: 388,036

[22] Filed: Aug. 1, 1989

[30] Foreign Application Priority Data

Aug. 4, 1988 [JP] Japan ................... 63-194849

[51] Int. Cl.⁵ .......................... H04M 11/02
[52] U.S. Cl. ...................... 379/61; 379/63; 379/67; 379/375
[58] Field of Search ........ 379/58, 61, 63, 67, 379/375

[56] References Cited

U.S. PATENT DOCUMENTS 4,761,806 8/1988 Toki ........................... 379/61
4,860,337 8/1989 Shimura ....................... 379/63

FOREIGN PATENT DOCUMENTS

0081821 4/1987 Japan ........................... 379/58

Primary Examiner—Jin F. Ng
Assistant Examiner—Dwayne D. Bost
Attorney, Agent, or Firm—Finnegan, Henderson, Farabow, Garrett and Dunner

[57] ABSTRACT

A radio telephone device which comprises a base unit connected to a wired circuit and a radio telephone connected to the base unit with a radio circuit, and in which a calling function is mutually provided between the base unit and the radio telephone. Switches for transmitting plural kinds of call signals via the radio circuit are provided at both or one of the base unit and the radio telephone, and speaker or speakers and display units for calling respectively different users corresponding to the plural call signals are provided at both or one of the radio telephone and the base unit.

15 Claims, 12 Drawing Sheets

MULTI-USER CORDLESS TELEPHONE CAPABLE OF DISCERNIBLY NOTIFYING EACH USER

BACKGROUND OF THE INVENTION

1. Field of the Invention

This invention relates to a radio telephone device comprising a base unit connected to a wired circuit and a radio telephone connected to the base unit with a radio circuit, and more particularly, to a device in which a calling function is mutually provided between the base unit and the radio telephone.

2. Description of the Related Art

There is known a multichannel-type radio telephone device which comprises a base unit connected to a wired circuit and a radio telephone connected to the base unit with a radio circuit, and which forms a conversation route between the radio telephone and the wired circuit using a vacant conversation channel among plural conversation channels to make possible conversation between the telephone of the correspondent connected to the wired circuit and the radio telephone.

In such a radio telephone, there is a case, for example, in which, although a call reception in the wired circuit is received at a general telephone provided at the base unit, a person desired by the correspondent is a user of a radio telephone located at a place remote from the base unit. In this case, in a conventional radio telephone device, since it is impossible to call the radio telephone from the base unit, it is necessary to perform a very troublesome operation such that a user of the general telephone provided at the base unit, for example, goes to the radio telephone and notifies the user of the radio telephone of the call reception, and conversation is exchanged by performing an off-hook at the radio telephone.

Similarly, there is also a case in which, although a call reception in the wired circuit is received at the radio telephone, a person desired by the correspondent is a user of the general telephone located at the base unit. In this case as well, in a conventional wired telephone device, since it is impossible to call the base unit from the radio telephone, it is necessary to perform a very troublesome operation such that the user of the radio telephone goes to the base unit and notifies the user of the general telephone provided at the base unit of the call reception, and conversation is exchanged by performing an off-hook at the general telephone.

Accordingly, there is considered a configuration in which a function for transmitting a call signal tone by a switching operation is added to one or both of the base unit and the radio telephone. In this configuration, however, there are problems such that it is only understood that someone is being called at the side of the base unit or the side of the radio telephone, and if there are, for example, two users near the radio telephone, it is impossible to know for whom the call is, and it becomes impossible to secure a private call in practical applications, and the like.

This problem can be solved by adding a conversation function between the base unit and the radio telephone, but such a configuration causes an increase in circuit scale and is therefore not preferable.

SUMMARY OF THE INVENTION

It is an object of the present invention to solve the problems as described above, and to provide a radio telephone device which can call one specified user with a simple configuration even when there are plural users near a base unit or a radio telephone.

This invention achieves the above object by providing transmission means for transmitting plural kinds of call signals to one or both of the base unit and the radio telephone via a radio circuit.

When a switch operation is performed at the base unit or the radio telephone, plural kinds of different call signals are transmitted to the correspondent in accordance with the switch operation or the operated switch. Accordingly, when calling Mr. A, it is possible to call specifying Mr. A by performing a switch operation for transmitting a call signal allocated to Mr. A.

Thus, in the present invention, since it is configured that plural kinds of all signals can be transmitted from the base unit or the radio telephone to the correspondent, it is possible to call specifying one user even when there are plural users near the radio telephone or the base unit. Furthermore, there is the advantage that, since only switches are added, circuit configuration need not be complicated.

DESCRIPTION OF THE PREFERRED EMBODIMENTS

Figure 1A:
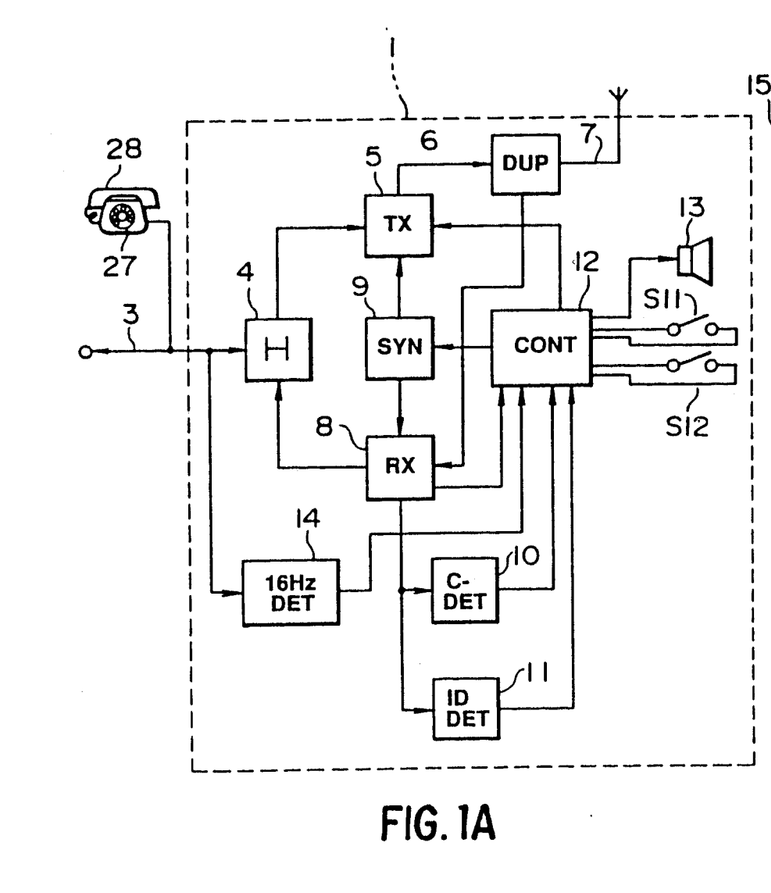
FIG. 1 is a block diagram showing an embodiment of the radio telephone device of the present invention.
Figure 1B:
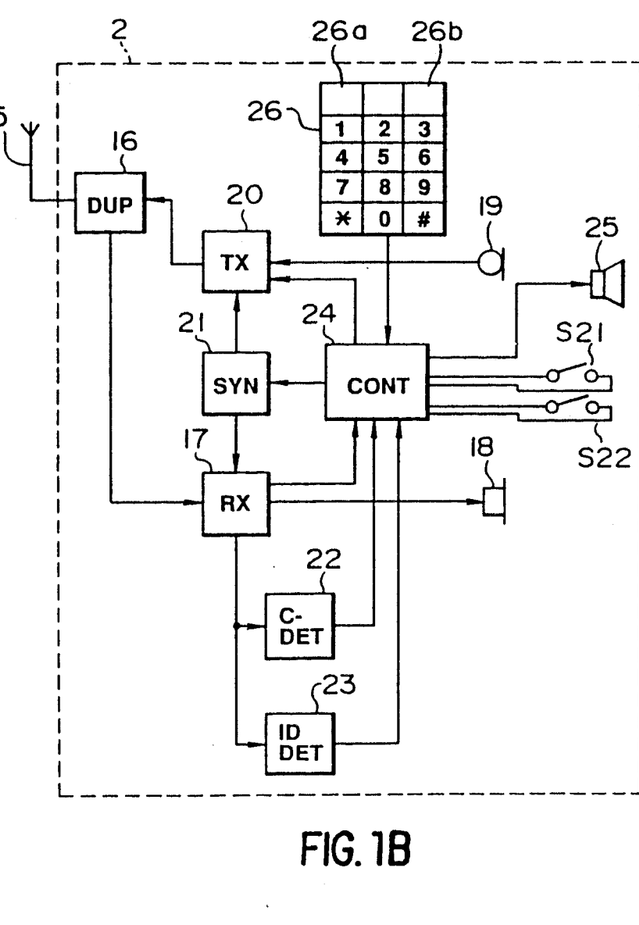

FIG. 1 shows an embodiment of the radio telephone device of the present invention in a block diagram. In FIG. 1, a base unit 1 is connected to a radio telephone 2 via a radio circuit, as well as to a wired telephone circuit (a subscriber's line) 3.

A signal transmitted from the wired telephone circuit 3 becomes an input for modulation to a transmitter 5 via a hybrid circuit 4. A radio wave modulated by the transmitter 5 is transmitted from an antenna 7 to the radio telephone 2 via an antenna duplexer 6.

On the other hand, the radio wave transmitted from the radio telephone 2 is received by the antenna 7 and demodulated at a receiver 8 via the antenna duplexer 6. The demodulated signal is transmitted to the wired telephone circuit 3 via the hybrid circuit 4.

A synthesizer 9 outputs a signal having frequencies corresponding to radio channels (a conversation channel and a control channel) to the transmitter 5 and the receiver 8.

One of outputs of the receiver 8 is input to a received-field detection circuit 10, and used for the determination of field strength. The circuit 10 is called in general a carrier squelch circuit, a noise squelch circuit or the like. Another output of the receiver 8 is output as a data signal included in the received demodulated wave, and input to an identifying-signal detection circuit 11 for collating an identifying signal determined by the combination of the base unit 1 and the radio telephone 2. The identifying signal is in general called an ID code.

Outputs of these detection circuits 10 and 11 and the demodulated output of the data signal are input to a control circuit 12, and used for connection control. The control circuit 12 performs switching operation of radio channels by controlling the synthesizer 9, or performs controls, such as transmission of a transmission data signal to the transmitter 5 as an input for modulation and the like.

A call-reception detection circuit 14 is for detecting a 16-Hz (hertz) call-receiving signal from the wired circuit. The output of the call-reception detection circuit 14 is also input to the control circuit.

A sounder 13 is for generating a ringing tone, and switches S11 and S12 are for transmitting call signals different from each other to the radio telephone 2, respectively.

Figure 12A:
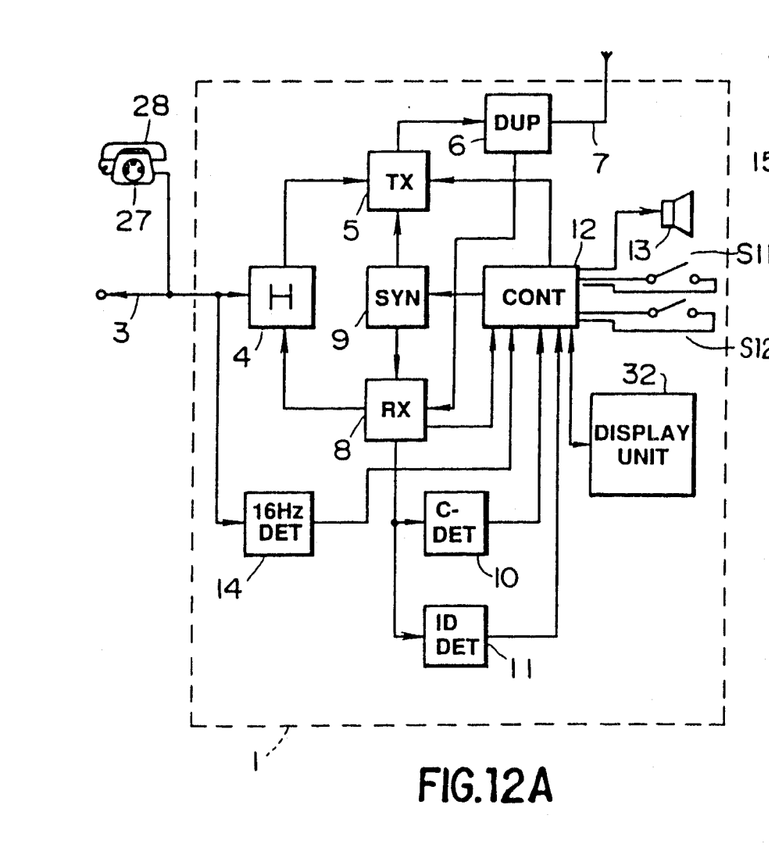
FIG. 12 is a block diagram showing still another embodiment of the radio telephone device of the present invention using a display unit.
Figure 12B:
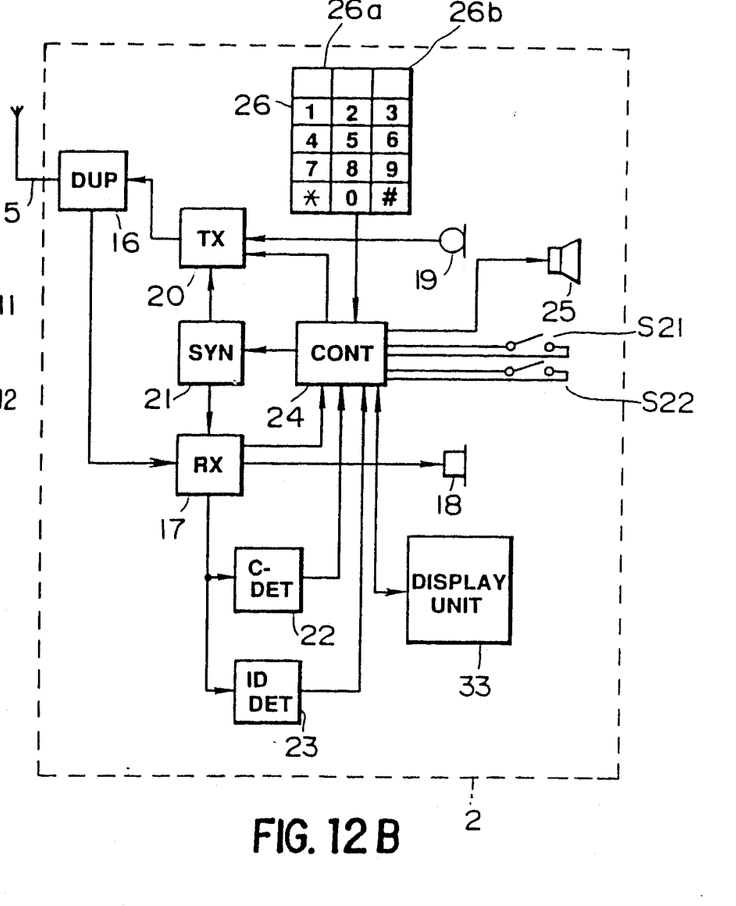

A display unit 32 in FIG. 12 is for indicating whether the device is in a conversation state or in a holding state. The display unit 32 is constituted by, for example, an LED, and is continuously lighted in a conversation state or in a self-holding state, flashed in a complete holding state, and put out in a waiting state.

On the other hand, an antenna 15, an antenna duplexer 16 and a receiver 17 are also provided at the radio telephone 2, and an demodulated output from the receiver 17 is output to a telephone receiver 18. A voice input from a transmitter 19 becomes an input for modulation for a transmitter 20, and is transmitted from the antenna 15.

A synthesizer 21, a received signals strength detection circuit 22 and an identifying signal detection circuit 23 are identical to those within the base unit 1, and a control circuit 24 performs control of the radio telephone 2. A speaker 25 is a sounder for generating a ringing tone when the switches S11 and S12 are operated at the moment of a call-reception at the base unit 1. A dial unit 26 is for inputting calls, clearing operations and dailing numbers.

Switches S21 and S22 are for transmitting call signals different from each other to the base unit 1, respectively.

Next, the operation of the device will be explained according to the flow charts in FIGS. 2 through 7. First, the operation until the device becomes in a conversation state will be explained. The device becomes in a conversation state when there is a call reception from the wired circuit 3, and when there is a calling from the radio telephone 2.

Figure 2:
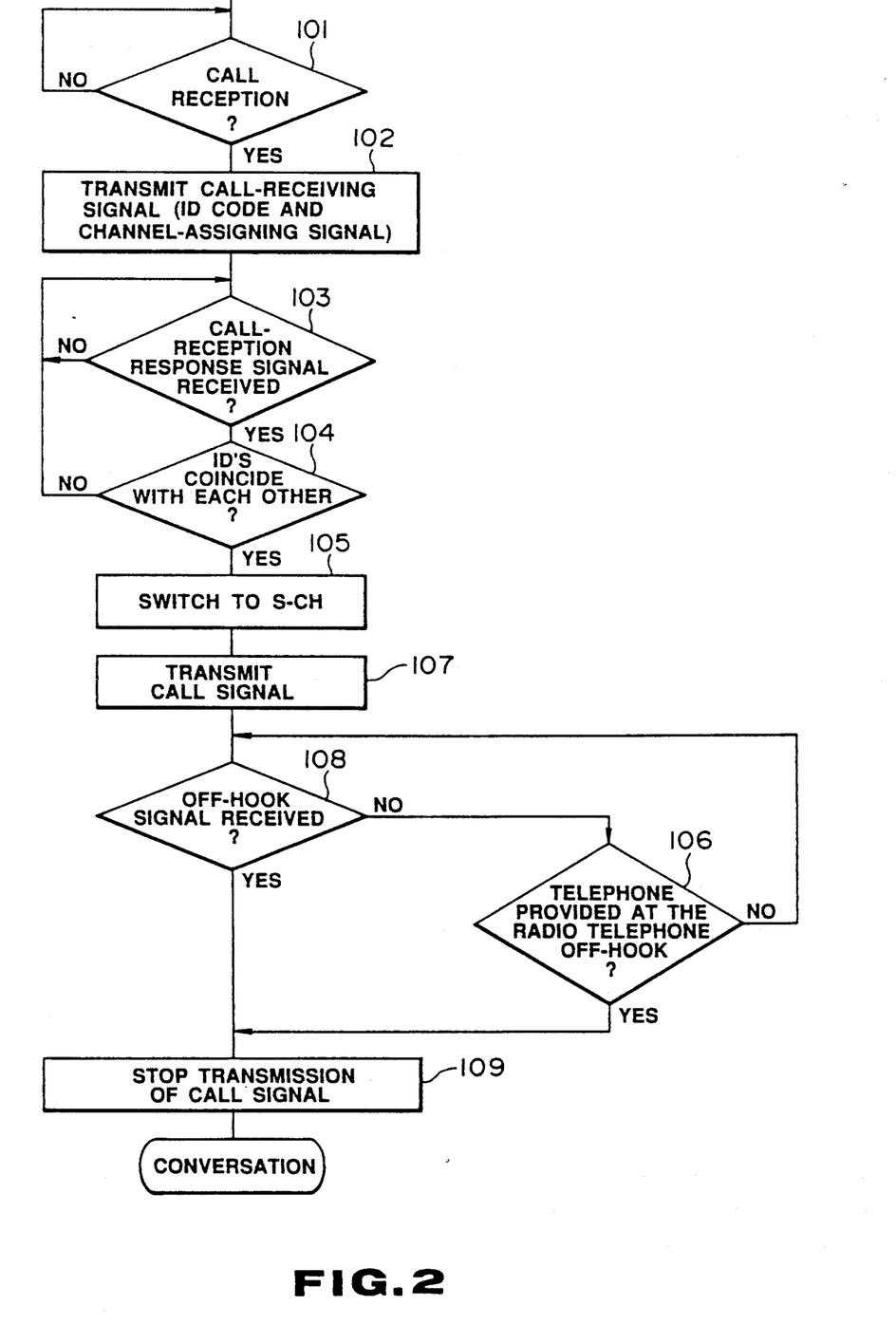
FIGS. 2 and 3 are flow charts showing the operations of a base unit and a radio telephone when there is a call reception from a wired circuit.
Figure 3:
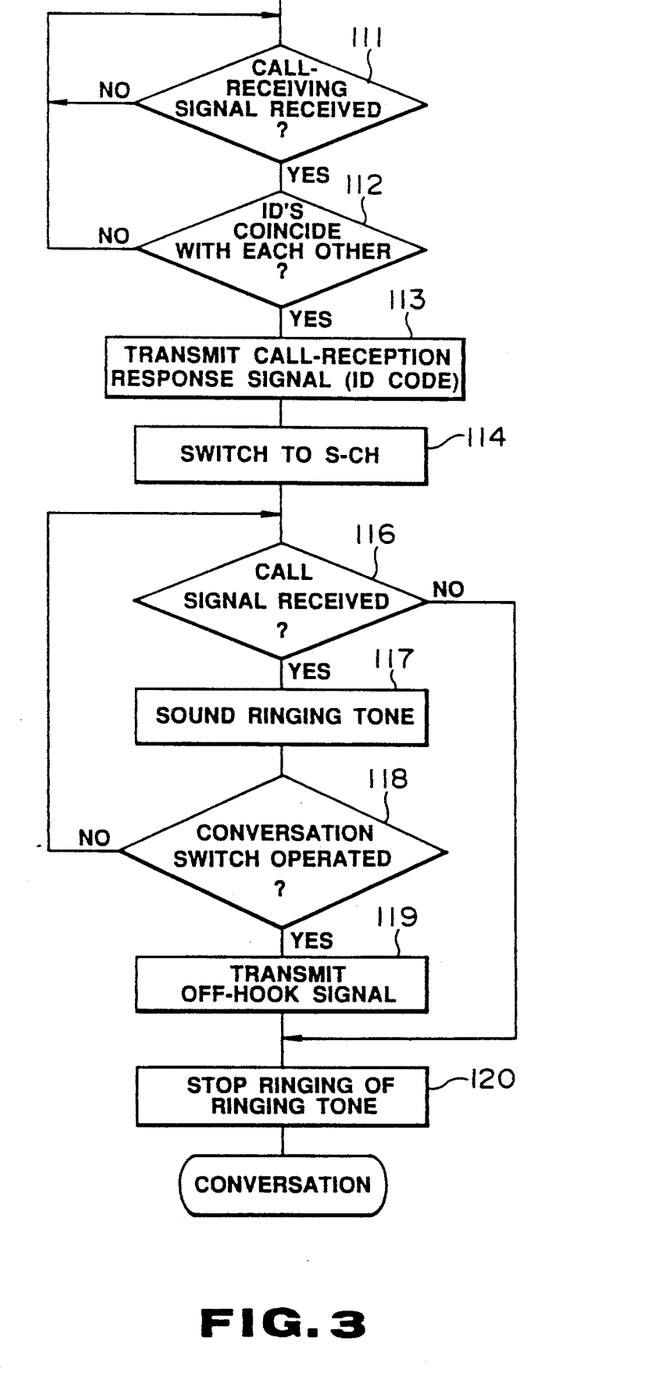

The operation of the base unit 1 when there is a call reception from the wired circuit 3 is shown in FIG. 2, and the operation of the radio telephone 2 is shown in FIG. 3.

When a 16-Hz call-receiving signal arrives from the wired circuit 3, the call-receiving signal is detected at the call-reception detection circuit 14, and the detected signal is added to the control circuit 12. The control circuit 12 thereby determines that there has been a call reception (step 101), and transmits a call-receiving signal via the antenna duplexer 6 and the antenna 7 controlling the transmitter 5 (step 102). The transmission of the call-receiving signal is performed through the control channel. An ID code and a channel-assigning signal for assigning a conversation channel are included in the call-receiving signal.

On the other hand, the radio telephone 2 receives the call-receiving signal by the receiver 17 via the antenna 15 and the antenna duplexer 16. The control circuit 24 detects the reception of the call-receiving signal by an output of the received signals strength detection circuit 22 (step 111). Subsequently, the control circuit 24 checks whether or not an ID code included in the call-receiving signal coincides with its own ID signal according to an output of the identifying-signal detection circuit 23 (step 112). If coincided, a call-reception response signal is transmitted via the antenna duplexer 16 and the antenna 15 controlling the transmitter 20 (step 113). An ID code is also included in the call-reception response signal. Subsequently, the control circuit 24 switches the radio channel of the transmitter 20 and the receiver 17 to the conversation channel assigned by the channel-assigning signal included in the above-described call-receiving signal controlling the synthesizer 21 (step 114).

When the control circuit 12 of the base unit 1 detects the reception of the call-reception response signal from the radio telephone 2 according to an output of the received-field detection circuit 10 (step 103), it checks whether or not an ID code included in the call-reception response signal coincides with its own ID code according to an output of the identifying-signal detection circuit 11 (step 104). If coincided, the control circuit 12 switches the radio channel of the transmitter 5 and the receiver 8 to the conversation channel assigned by the channel-assigning signal transmitted together with the call-receiving signal controlling the synthesizer 9 (step 105). A call signal is then transmitted through the conversation channel (step 107).

When the radio telephone 2 receives the call signal (step 116), it sounds a ringing tone controlling the speaker 25 (step 107). When a conversation switch 26a of the dial unit 26 is operated in response to the ringing tone (step 118), an off-hook signal is transmitted to the base unit 1 (step 119).

When the base unit 1 receives the off-hook signal (step 108), or there is an off-hook at the telephone 28 provided at the radio telephone 2 (step 106), the base unit 1 stops the transmission of the ringing tone (step 109). The radio telephone 2 thereby stops the ringing of the ringing tone from the speaker 25 (step 120), and the base unit 1 and the radio telephone become in a conversation state.

Figure 4:
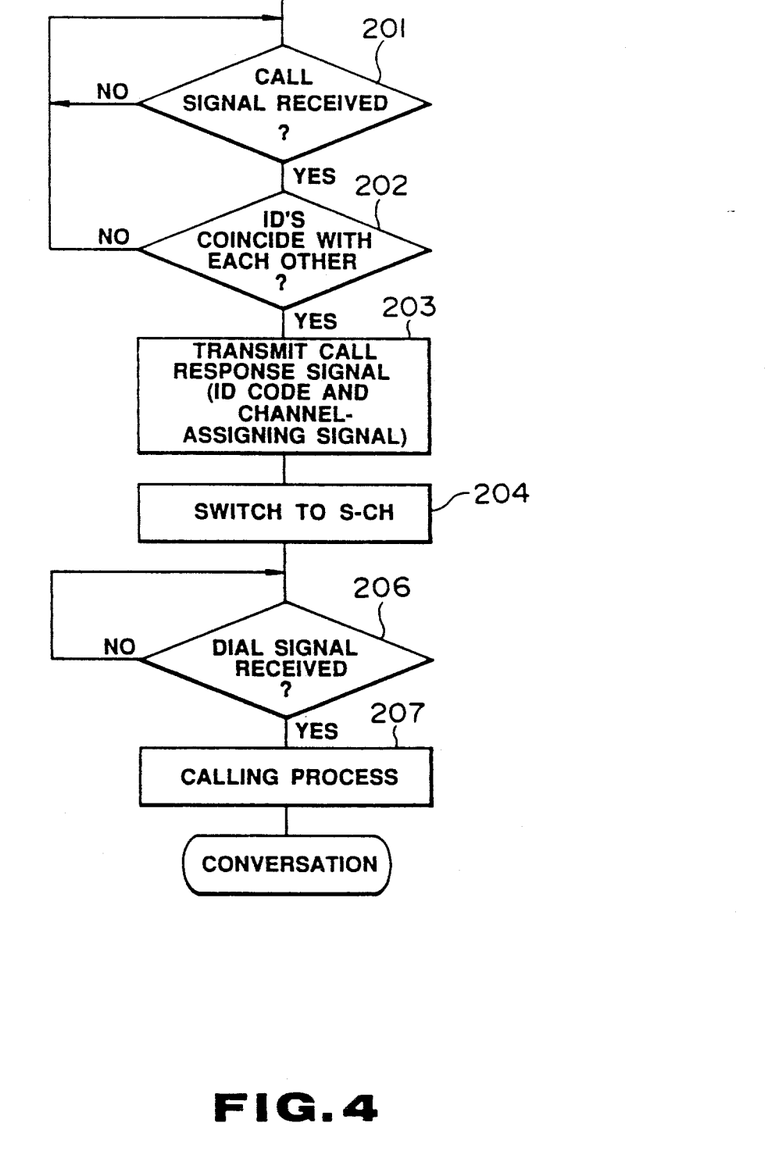
FIGS. 4 and 5 are flow charts showing the operations of the base unit and the radio telephone when there is a call from the radio telephone.
Figure 5:
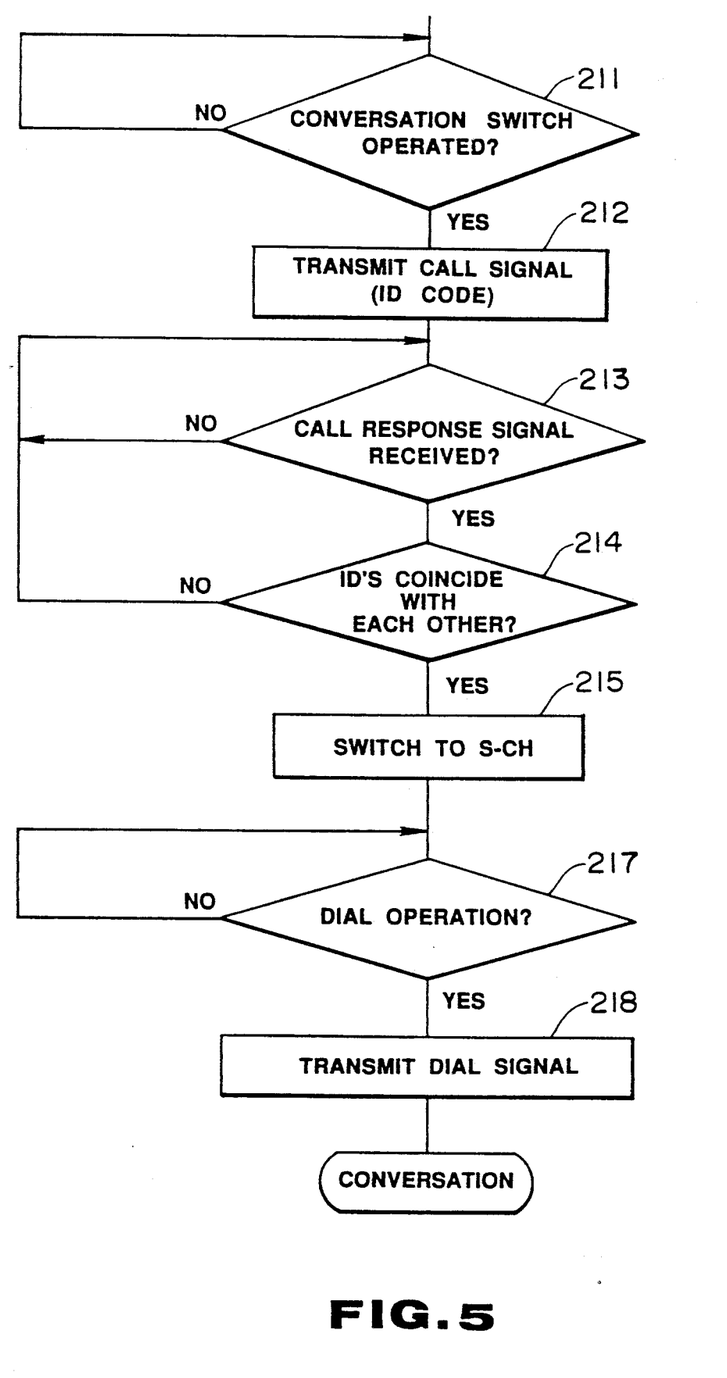

The operation of the base unit 1 when there is a calling from the radio telephone 2 is shown in FIG. 4, and the operation of the radio telephone 2 is shown in FIG. 5.

When the conversation switch 26a is operated at the radio telephone 2 (step 211), a call signal is transmitted from the radio telephone 2 (step 212). An ID code is included in the call signal.

When the base unit 1 receives the call signal (step 201), it checks whether or not an ID code included in the call signal coincides with its own ID code (step 202). If coincided, the base unit 1 transmits a call response signal to the radio telephone 2 (step 203). The call response signal includes an ID code and a channel-assigning signal for assigning a conversation channel. Subsequently, the base unit 1 performs switching to the conversation channel assigned by the channel-assigning signal (step 204).

The radio telephone 2 receives the call response signal from the base unit 1 (step 213), and if an ID code included in the signal coincides with its own ID code (step 214), it performs switching to the conversation channel assigned by the channel-assigning signal included in the call-response signal (step 215).

Subsequently, when a dial operation for the correspondent is performed at the dial unit 26 of the radio telephone 2 (step 217), the dial signal is transmitted to the base unit 1 (step 218).

When the base unit 1 receives the dial signal (step 206), it forms a conversation loop for the wired circuit 3, and excutes a predetermined calling process for calling the correspondent transmitting the dial signal to the wired circuit 3 (step 207). If the correspondent thereby responds, the base unit 1 and the radio telephone 2 become in a conversation state.

Figure 6:
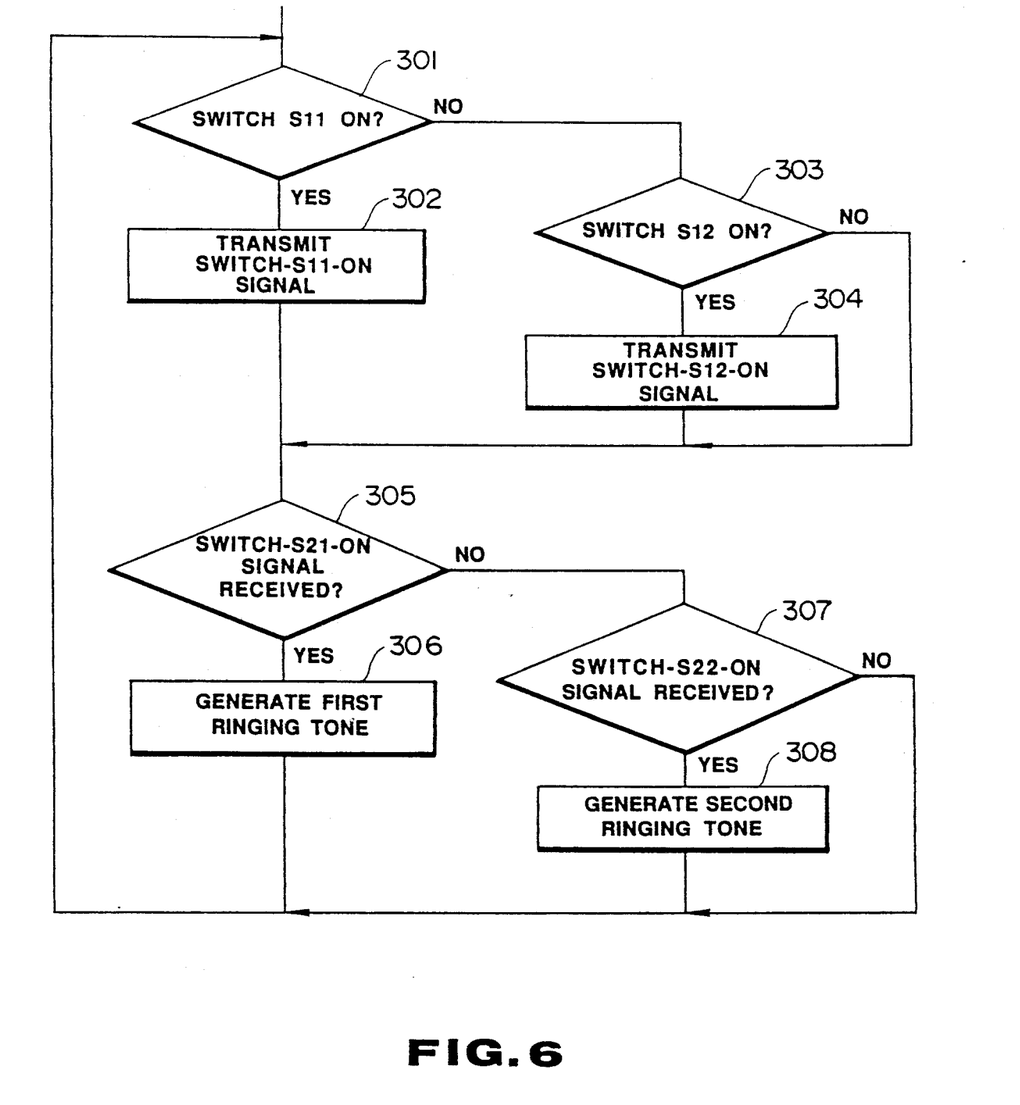
FIGS. 6 and 7 are flow charts showing the operations of the base unit and the radio telephone relative to a ringing tone.
Figure 7:
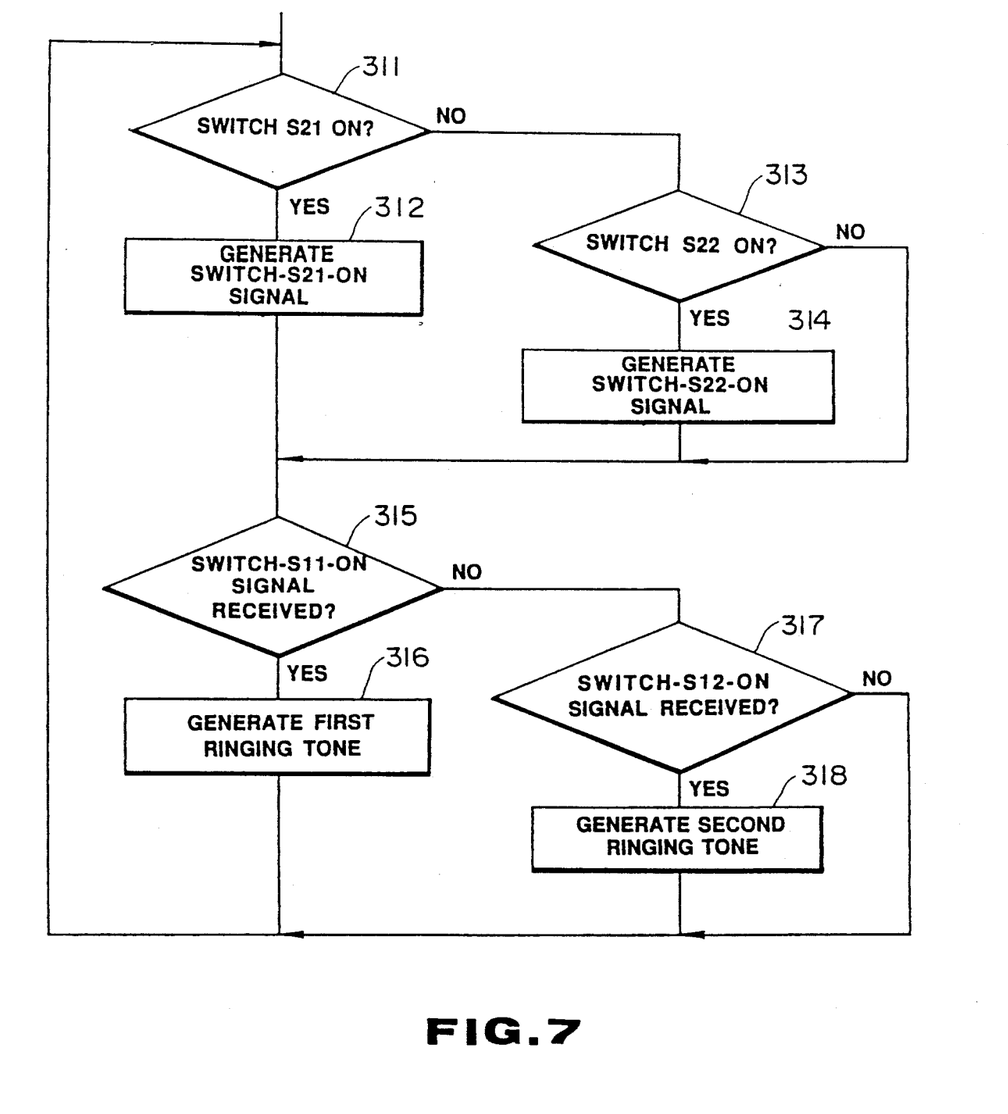

FIGS. 6 and 7 show the processing operations of the base unit 1 and the radio telephone 2, when a specific user of the radio telephone 2 is called from the base unit 1, and when a specific user of the general telephone 28 provided at the base unit 1 is called from the radio telephone 2, respectively, in the above-described conversation state.

Consider, for example, a case in which, in response to a call reception from the wired circuit 3, an off-hook is made at the general telephone 28 provided at the base unit 1 to be in a conversation state, but the person desired by the correspondent is user A of the radio telephone 2. In this case, the user of the general telephone 28 switches on a switch S11 for calling the user A in the base unit 1.

When the switch S11 is switched on (step 301), the control circuit 12 of the base unit 1 controls the transmitter 5 and transmits a switch-S11-on signal from the transmitter 5 via the antenna duplexer 6 and the antenna 7 (step 302). The switch-S11-on signal in this case is transmitted using the conversation channel.

The radio telephone 2 receives the switch-S11-on signal by the receiver 17 via the antenna 15 and the antenna duplexer 16. When the control circuit 24 of the radio telephone 2 detects the reception of the switch-S11-on signal (step 315), it generates a first ringing tone which sounds, for example, "peep, peep" driving the speaker 25 (step 316).

Similarly, when the person desired by the correspondent is another user, user B of the radio telephone 2, the user of the general telephone 28 switches on a switch S12 for calling the user B in the base unit 1.

When the switch S12 is switched on (step 303), the control circuit 12 of the base unit 1 controls the transmitter 5 and transmits a switch-S12-on signal from the transmitter 5 via the antenna duplexer 6 and the antenna 7 (step 304). The switch-S12-on signal in this case is transmitted using the conversation channel.

The radio telephone 2 receives the switch-S12-on signal by the receiver 17 via the antenna 15 and the antenna duplexer 16. When the control circuit 24 of the radio telephone 2 detects the reception of the switch-S12-on signal (step 317), it generates a second ringing tone which sounds, for example, "pip, pip" driving the speaker 25 (step 318).

Next, consider a case in which the radio telephone 2 responds to a call reception from the wired circuit 3 to be in a conversation state, but the person desired by the correspondent is user C of the telephone 28 provided at the base unit 1. In this case, the user of the radio telephone 2 switches on a switch S21 for calling the user C in the radio telephone 2.

When the switch S21 is switched on (step 311), the control circuit 24 of the radio telephone 2 controls the transmitter 2 and transmits a switch-S21-on signal from the transmitter 20 via the antenna duplexer 16 and the antenna 15 (step 312). The switch-S21-on signal in this case is transmitted through the conversation channel.

The base unit 1 receives the switch-S21-on signal by the receiver 8 via the antenna 7 and the antenna duplexer 6. When the control circuit 12 of the base unit 1 detects the reception of the switch-S21-on signal (step 305), it generates a first ringing tone which sounds, for example, "peep, peep" driving the speaker 13 (step 306).

Similarly, when the person desired by the correspondent is another user D of the base unit 1, the user of the radio telephone 2 switches on a switch S22 for calling corresponding to the user D in the radio telephone 2.

When the switch S22 is switched on (step 313), the radio telephone 2 controls the transmitter 20 and transmits a switch-S22-on signal from the transmitter 20 via the antenna duplexer 16 and the antenna 15 (step 304). The switch-S22-on signal in this case is transmitted using the conversation channel.

The base unit 1 receives the switch-S22-on signal by the receiver 8 via the antenna 7 and the antenna duplexer 6. When the control circuit 12 of the base unit 1 detects the reception of the switch-S22-on signal (step 307), it generates a second ringing tone which sounds, for example, "pip, pip" driving the speaker 13 (step 318).

Thus, when it is desired to call a specific user of the radio telephone 2 from the base unit 1, calling can be performed by operating the switch S11 or S12 of the base unit 1, and when it is desired to call a specific user of the base unit 1 (a specific user of the general telephone 28 provided at the base unit 1) from the radio telephone 2, calling can be performed by operating the switch S21 or S22 of the radio telephone 2.

In the above-described embodiment, an explanation has been provided about a case in which the switches S11 and S21 or S21 and S22 are operated after a conversation channel has been set between the base unit 1 and the radio telephone 2. When the switches S11 and S21 or S21 and S22 are operated in a state in which a conversation channel has not been set between the base unit 1 and the radio telephone 2, a conversation channel is first set between the base unit 1 and the radio telephone 2, and transmission of the switch-S11-on signal and the switch-S21-on signal or the switch-S12-on signal and the switch-S22-on signal is then performed.

The ringing tone is not limited to the two kinds, that is, the first ringing tone and the second ringing tone, but three kinds or more ringing tones may also be used. In this case, the number of switches for calling provided at the base unit 1 and the radio telephone 2 is also increased in accordance with the increase in the number of ringing tones.

When there are provided dial key pads used for telephone functions, they may be used as switches for calling. If switches for calling are separately provided, they may not be provided with as many kinds of signals, but ringing tones to be generated may also be discriminated by the way of on/off (the length of on-period and the like) of a switch.

A configuration in which one-way calling, that is, only from the base unit 1 to the radio telephone 2, or only from the radio telephone 2 to the base unit 1, is performed may also be provided.

Furthermore, the ringing tone may also be discriminated by either of its tone, pitch and mode of sounding, or a combination of two or less of these items.

Relative to aspects of calling, a call may also be notified by a combination of a sounder and a display device.

Figure 8A:
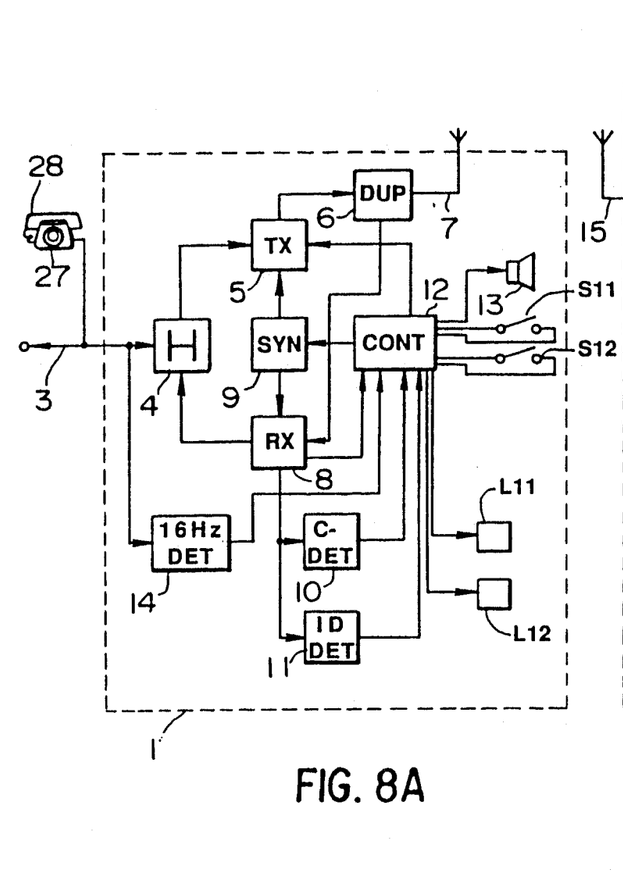
FIG. 8 is a block diagram showing a further embodiment of the radio telephone device of the present invention.
Figure 8B:
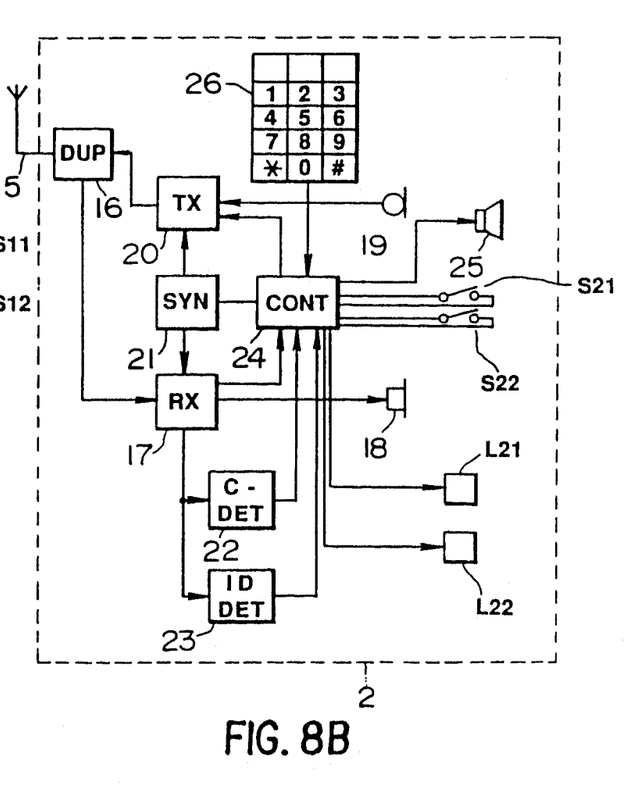

FIG. 8 shows a further embodiment in which a call is notified using a speaker and a light-emitting device (LED). The configuration shown in FIG. 8 is made by providing light-emitting devices L11 and L12 at the base unit 1, and L21 and L22 at the radio telephone 2, in addition to the configuration shown in FIG. 1. The calling operations of the present embodiment are shown by flow charts in FIGS. 9 and 10. The operations of the present embodiment are basically identical to those shown in FIGS. 6 and 7. In the case of the present embodiment, when the switch S11 is switched on at the base unit 1 (step 401), the switch-S11-on signal is transmitted from the base unit 1 to the radio telephone 2 (step 402). When the radio telephone 2 receives the switch-S11-on signal (step 415), it lights the light emitting device L21 (step 416) and at the same time generates a ringing tone (step 419). On the other hand, when the switch S12 is switched on at the base unit 1 (step 403), the switch-S12-on signal is transmitted from the base unit 1 to the radio telephone 2 (step 404). When the radio telephone 2 receives the switch-S12-on signal (step 417), it lights the light-emitting device L22 (step 418) and at the same time generates a ringing tone (step 419). In this case, the ringing tones by on-operations of the switch S11 and the switch S12 need not be different from each other.

Figure 9:
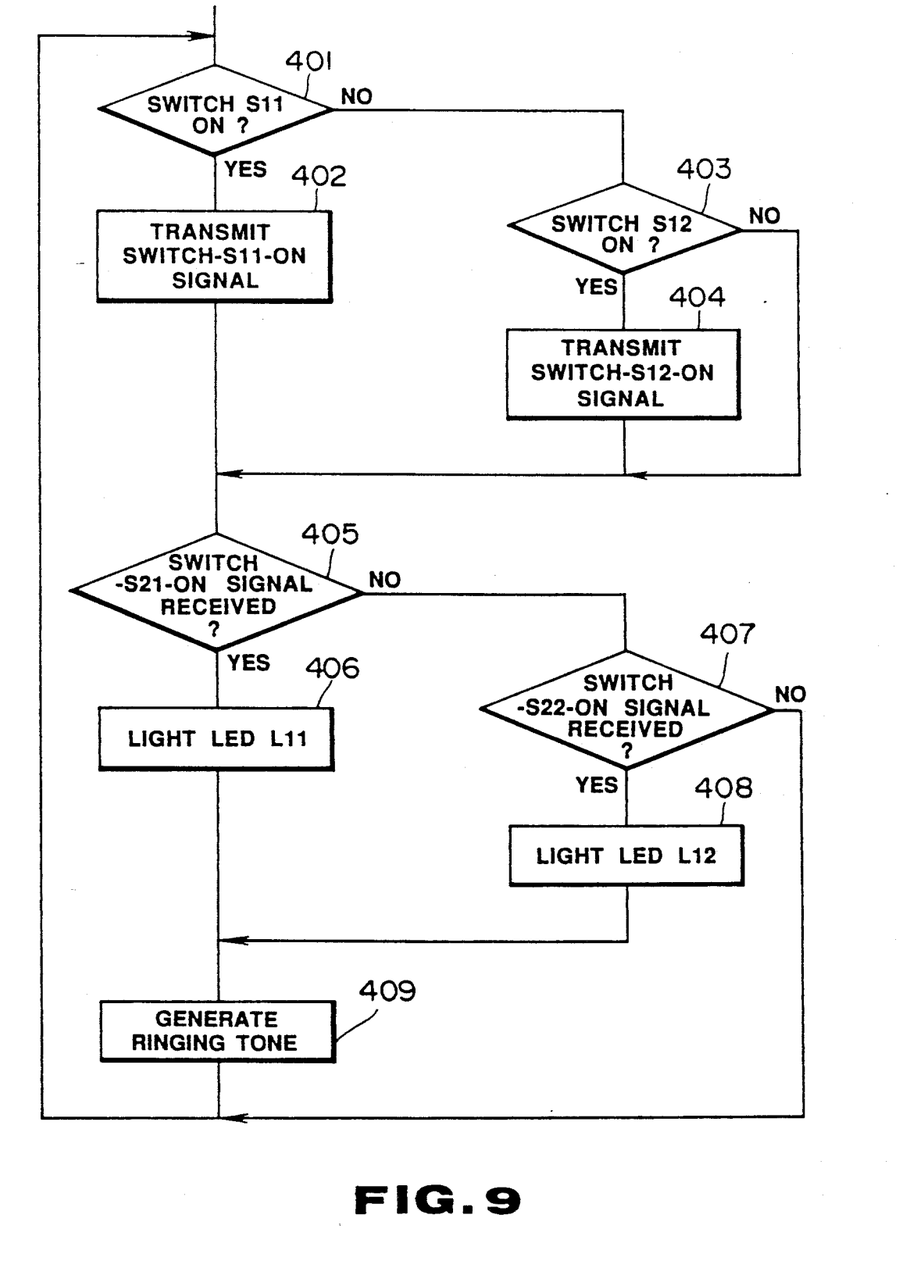
FIGS. 9 and 10 are block diagrams showing ringing-tone generation operations in the embodiment shown in FIG. 8.
Figure 10:
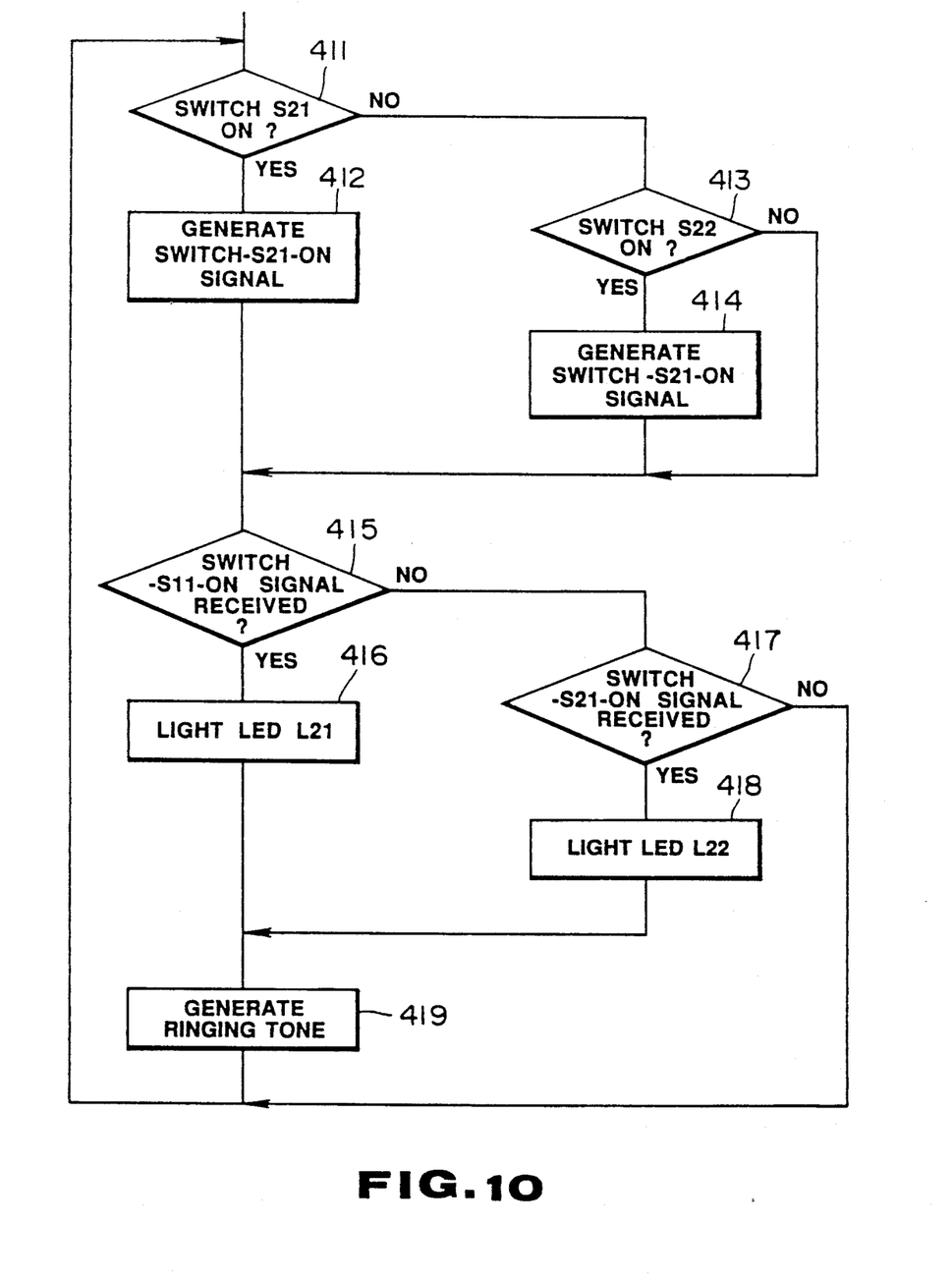

When the switch S21 is switched on at the radio telephone 2 (step 411), the switch-S21-on signal is transmitted from the radio telephone 2 to the base unit 1 (step 412). When the base unit 1 receives the switch-S21-on signal (step 405), it lights the light-emitting device L11 (step 406) and at the same time generates a ringing tone (step 409). On the other hand, when the switch S22 is switched on at the radio telephone 2 (step 414), the switch-S22-on signal is transmitted from the radio telephone 2 to the base unit 1 (step 419). When the base unit 1 receives the switch-S22-on signal (step 407), it lights the light-emitting device L12 (step 408) and at the same time generates a ringing tone (step 409). In this case, the ringing tones by on-operations of the switch S21 and the switch S22 need not be different from each other.

Accordingly, in the present embodiment, it is possible to discriminate users by confirming a selected LED being lighted.

Figure 11A:
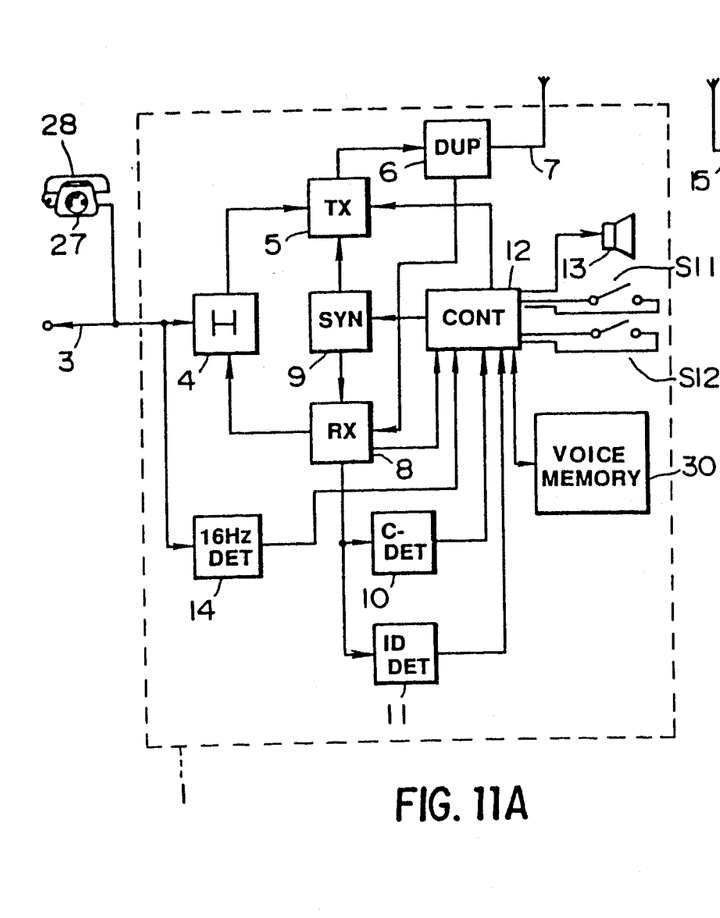
FIG. 11 is a block diagram showing a still further embodiment of the radio telephone device of the present invention using a voice memory.
Figure 11B:
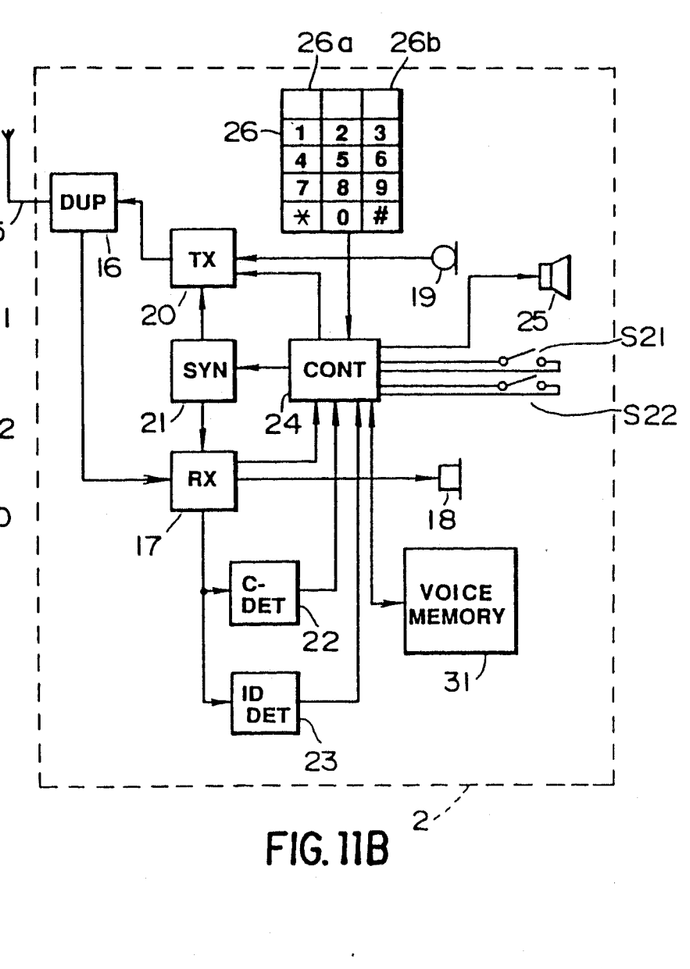

Furthermore, as shown in FIG. 11, there may be adopted a configuration in which voice memories 30 and 31 are provided at the base unit 1 and the radio telephone 2, respectively. Voices different from each other are read from the voice memories 30 and 31 in accordance with operations of switches for calling, and the voices are sounded.

For example, a voice saying "a telephone call for Mr. A" corresponding to the switch S11 of the base unit 1 and a voice saying "a telephone call for Mr. B" corresponding to the switch S12 are stored in the voice memory 31 of the radio telephone 2.

Furthermore, a voice saying "a telephone call for Mr. C" corresponding to the switch S21 of the radio telephone 2 and a voice saying "a telephone call for Mr. D" corresponding to the switch S22 are stored in the voice memory 30 of the base unit 1.

According to this configuration, when the switch S11 of the base unit 1 is, for example, operated, a signal indicating the operation is transmitted from the base unit 1 to the radio telephone 2. At the radio telephone 2, the voice saying "a telephone call for Mr. A" is read from the voice memory 31 in response to the received signal, and the voice is sounded from the speaker 25.

When the switch S12 of the base unit 1 is operated, a signal indicating the operation is transmitted from the base unit 1 to the radio telephone 2. At the radio telephone 2, the voice saying "a telephone call for Mr. B" is read from the voice memory 31 in response to the received signal, and the voice is sounded from the speaker 25.

When the switch S21 of the radio telephone 2 is operated, a signal indicating the operation is transmitted from the radio telephone 2 to the base unit 1. At the base unit 1, the voice saying "a telephone call for Mr. C" is read from the voice memory 30 in response to the received signal, and the voice is sounded from the speaker 13.

Similarly, when the switch S22 of the radio telephone 2 is operated, a signal indicating the operation is transmitted from the radio telephone 2 to the base unit 1. At the base unit 1, the voice saying "a telephone call for Mr. D" is read from the voice memory 30 in response to the received signal, and the voice is sounded from the speaker 13.

FIG. 12 shows a still further embodiment of the present invention having a configuration in which display units 31 and 33 for displaying users in calling are provided at the base unit 1 and the radio telephone 2, respectively, and specific users are called according to the contents of display of the display units 32 and 33. The display units 32 and 33 are configured by, for example, liquid-crystal display units, and display characters indicating, for example, "a telephone call for Mr. A". More concretely, the content of display corresponding to the switches S11 and S12 of the base unit 1 for the display unit 33 of the radio telephone 2 has previously been stored within its control circuit 24, and the content of display corresponding to the switches S21 and S22 of the radio telephone 2 for the display unit 32 of the base unit 1 has previously been stored within its control circuit 12.

According to the configuration in FIG. 12, when the switch S11 is switched on at the base unit 1, a ringing tone is generated from the speaker 25 of the radio telephone 2, and at the same time the display indicating "a telephone call for Mr. A" is performed on the display unit 32.

When the switch S12 is switched on at the base unit 1, a ringing tone is generated from the speaker 25 of the radio telephone 2, and at the same time the display indicating "a telephone call for Mr. B" is performed on the display unit 32.

Furthermore, when the switch S21 is switched on at the radio telephone 2, a ringing tone is generated from the speaker 13 of the base unit 1, and at the same time the display indicating "a telephone call for Mr. C" is performed on the display unit 32.

Similarly, when the switch S22 is switched on at the radio telephone 2, a ringing tone is generated from the speaker 13 of the base unit 1, and at the same time the display indicating "a telephone call for Mr. D" is performed on the display unit 32.

In the configuration of FIG. 12, it may be configured such that displays of the display units 32 and 33 are performed by pressing predetermined keys whenever necessary.

In this case, it is configured so that, for example, in a state in which the switch S11 of the base unit 1 is switched on and a ringing tone is being generated from the speaker 25, if the "#" key on the dial unit 26 is, for example, pressed, the display indicating "a telephone call for Mr. A" appears on the display unit 33 in response to the pressing.

What is claimed is:

1. A cordless telephone system comprising:
   a base unit connected to a subscriber line;
   a radio telephone to be directly connected to the base unit via a radio link;
   radio-link establishing means for establishing the radio link between said base unit and said radio telephone;
   a plurality of operator activated switches provided at said base unit for generating a plurality of switch-on signals in response to the activation of the switches;
   transmitting means provided at said base unit for transmitting the switch-on signals to said radio telephone via the radio link in response to the generation of the switch-on signals;
   receiving means provided at said radio telephone for receiving one of said switch-on signals transmitted via the radio link; and
   identifying means responsive to said receiving means for providing a plurality of identifications corresponding to the switch-on signals to users of said radio telephone.

2. A cordless telephone system according to claim 1, wherein said identifying means comprises:
   ringing-tone generation means for generating a respectively different ringing tone corresponding to the received switch-on signals.

3. A cordless telephone system according to claim 1, wherein said identifying means comprises:
   ringing-tone generation means for generating a ringing tone, and
   a plurality of display means;
   wherein said identifying means drives said ringing-tone generation means corresponding to the received switch-on signals and selectively drives a corresponding one of said plurality of display means.

4. A cordless telephone system according to claim 1, wherein said identifying means comprises:
   ringing-tone generation means for generating a ringing tone, and
   display means for displaying information;
   wherein said identifying means drives said ringing-tone generation means and said display means corresponding to the received switch-on signals.

5. A cordless telephone system according to claim 1, wherein said identifying means comprises:
   a voice memory storing a plurality of voice messages;
   wherein said identifying means selectively reads one voice message from said voice memory corresponding to the received switch-on signals and generates the selected voice message.

6. A cordless telephone system comprising:
   a base unit connected to a subscriber line;
   a radio telephone to be directly connected to the base unit via a radio link;
   radio-link establishing means for establishing the radio link between said base unit and said radio telephone;
   a plurality of operator activated switches provided at said radio telephone for generating a plurality of switch-on signals in response to the activation of the switches;
   transmitting means provided at said radio telephone for transmitting the switch-on signals to said base unit via the radio link in response to the generation of the switch-on signals;
   receiving means provided at said base unit for receiving one of said switch-on signals transmitted via the radio link; and
   identifying means responsive to said receiving means for providing a plurality of identifications corresponding to the switch-on signals to users of said base unit.

7. A cordless telephone system according to claim 6, wherein said identifying means comprises:
   ringing-tone generation means for generating a respectively different ringing tone corresponding to the received switch-on signals.

8. A cordless telephone system according to claim 6, wherein said identifying means comprises:
   ringing-tone generation means for generating a ringing tone; and
   a plurality of display means for displaying information;
   wherein said identifying means drives said ringing-tone generation means corresponding to the received switch-on signals and selectively drives a corresponding one of said plurality of display means.

9. A cordless telephone system according to claim 6, wherein said identifying means comprises:
   ringing-tone generation means for generating a ringing tone; and
   display means for displaying information;
   wherein said identifying means drives said ringing-tone generation means and said display means corresponding to the received switch-on signals.

10. A cordless telephone system according to claim 6, wherein said identifying means comprises:
    a voice memory storing a plurality of voice messages;
    wherein said identifying means selectively reads one voice message from said voice memory corresponding to the received switch-on signals and generates the selected voice message.

11. A cordless telephone system comprising:
    a base unit connected to a subscriber line;
    a radio telephone to be directly connected to the base unit via a radio link;
    radio-link establishing means for establishing the radio link between said base unit and said radio telephone;
    a plurality of first operator activated switches provided at said base unit for generating a plurality of first switch-on signals in response to the activation of the first operator activated switches;
    a plurality of second operator activated switches provided at said radio telephone for generating a plurality of second switch-on signals in response to the activation of the second operator activated switches;

first transmitting means provided at said base unit for transmitting the first switch-on signals to said radio telephone via the radio link in response to the generation of the first switch-on signals;

second transmitting means provided at said radio telephone for transmitting the second switch-on signals to said base unit via the radio link in response to the generation of the second switch-on signals;

first receiving means provided at said radio telephone for receiving the first switch-on signals transmitted via the radio link;

second receiving means provided at said base unit for receiving the second switch-on signals transmitted via the radio link;

first identifying means for providing a plurality of first identifications corresponding to the first switch-on signals to users of said radio telephone; and second identifying means for providing a plurality of second identifications corresponding to the second switch-on signals to users of said base unit.

12. A cordless telephone system according to claim 11, wherein said first identifying means comprises:
first ringing-tone generation means for generating a respectively different first ringing tone corresponding to the received first switch-on signals, and
said second identifying means comprises:
second ringing-tone generation means for generating a respectively different second ringing tone corresponding to the received second switch-on signals.

13. A cordless telephone system according to claim 11, wherein said first identifying means comprises:
first ringing-tone generation means for generating a first ringing tone; and
a plurality of first display means for displaying information;
wherein said first identifying means drives said first ringing-tone generation means in response to the received first switch-on signals, and
said second identifying means comprises:
second ringing-tone generation means for generating a second ringing tone; and
a plurality of second display means for displaying information;
wherein said second identifying means drives said second ringing-tone generation means in response to the received second switch-on signals.

14. A cordless telephone system according to claim 11, wherein said first identifying means comprises:
first ringing-tone generation means; and
first display means;
wherein said first identifying means drives said first ringing-tone generation means and said first display means corresponding to the received first switch-on signals, and
said second identifying means comprises:
second ringing-tone generation means; and
second display means;
wherein said second identifying means drives said second ringing-tone generation means and said second display means corresponding to the received second switch-on signals.

15. A cordless telephone system according to claim 11, wherein said first identifying means comprises:
a first voice memory storing a plurality of voice messages,
wherein said first identifying means selectively reads one voice message from said first voice memory corresponding to the received first switch-on signals and generates the selected voice message, and
said second identifying means comprises:
a second voice memory storing a plurality of voice messages,
wherein said second identifying means selectively reads one voice message from said second voice memory corresponding to the received second switch-on signals and generates the selected voice message.

* * * * *